United States Patent [19]
Pelzer et al.

[11] Patent Number: 6,010,870
[45] Date of Patent: Jan. 4, 2000

[54] COMPOSITES OF POLYHYDROXY FATTY ACIDS AND FIBROUS MATERIALS

[75] Inventors: Helmut Pelzer, Herclecge; Alexander Steinbüchel, Altenberje, both of Germany

[73] Assignee: HP-Chemie Pelzer Research and Development Ltd., Waterford, Ireland

[21] Appl. No.: 09/068,893

[22] PCT Filed: Nov. 12, 1996

[86] PCT No.: PCT/EP96/04939

§ 371 Date: Nov. 3, 1998

§ 102(e) Date: Nov. 3, 1998

[87] PCT Pub. No.: WO97/19212

PCT Pub. Date: May 29, 1997

[30] Foreign Application Priority Data

Nov. 23, 1995 [DE] Germany .................. 195 43 635

[51] Int. Cl.⁷ .................. D04H 1/00; D04H 1/58; C12P 7/62
[52] U.S. Cl. .................. 435/41; 435/132; 435/134; 435/155; 435/170; 523/124; 523/128
[58] Field of Search .................. 435/41, 132, 134, 435/155, 170; 523/124, 128

[56] References Cited

U.S. PATENT DOCUMENTS

| | | |
|---|---|---|
| 3,107,172 | 10/1963 | Baptist et al. . |
| 5,135,859 | 8/1992 | Witholt et al. .................. 435/135 |
| 5,191,037 | 3/1993 | Doi et al. .................. 525/450 |
| 5,350,627 | 9/1994 | Nemphos et al. .................. 428/288 |
| 5,744,516 | 4/1998 | Hashitan et al. .................. 523/124 |

FOREIGN PATENT DOCUMENTS

| | | |
|---|---|---|
| 444880 | 9/1991 | European Pat. Off. . |
| 4416357 | 11/1995 | Germany . |
| 5041923 | 2/1993 | Japan . |
| 6107935 | 4/1994 | Japan . |
| 7119098 | 5/1995 | Japan . |
| 9205311 | 4/1992 | WIPO . |

OTHER PUBLICATIONS

Haywood, G.W., et al., "A Survey of the Accumulation of Novel Polyhydroxyalkanoates by Bacteria", *Biotechnol. Letters*, vol. 11, No. 7 (1989) pp. 471–476.

Timm, A., et al., "Formation of Polyesters Consisting of Medium–Chain–Length 3–Hydroxyalkanoic Acids from Gluconate by *Pseudomonas aeruginosa* and other Fluorescent Psuedomonads", *Applied and Environmental Microbiology*, vol. 56, No. 11 (1990) pp. 3360–3367.

Lageveen, R.G., "Formation of Polyesters by *Pseudomonas oleovorans*: Effect of Substrates on Formation and Composition of Poly–(R)–3–Hydroxyalkanoates and Poly–(R)–3–Hydroxyalkenoates", *Applied and Environmental Microbiology*, vol. 54, No. 12 (1988) pp. 2924–2932.

Huisman, G.W., et al., "Synthesis of Poly–3–Hydroxyalkanoates is a Common Feature of Fluorescent Pseudomonads", *Applied and Environmental Microbiology*, vol. 55, No. 8 (1989) pp. 1949–1954.

*Primary Examiner*—Nathan M. Nutter
*Attorney, Agent, or Firm*—Baker & Botts, L.L.P.

[57] ABSTRACT

The present invention relates to the use of a composite material made of a fibrous material and binders in the form of a polymer of hydroxyfatty acids for the preparation of molded parts in the automobile field, in particular, for acoustic attenuation in the areas of the hood, bulkhead (on both sides), tunnel, door, roof, footwell, pumps, A to D pillars and air distribution duct, and as an optionally self-supporting base for interior trims, especially for instrument panel covers, tunnel linings, door trims, seat back linings, A to D pillar linings and spare wheel covers, and as parts with a double function, especially as roof liner, rear shelf, filling piece, trunk mat or undershield.

11 Claims, No Drawings

COMPOSITES OF POLYHYDROXY FATTY ACIDS AND FIBROUS MATERIALS

BACKGROUND OF THE INVENTION

1. Field of the Invention

The present invention relates to the use of composite materials made of poly(hydroxyfatty acids) as binders and fibrous materials for the preparation of molded parts in the automobile field.

2. Description of the Related Art

Composite materials such as textile fiber fleeces consist of fibrous materials and a binder material. Phenol resins are mainly used as the binder although their environmental compatibility is doubtful.

U.S. Pat. No. 5,350,627 A describes the use of biodegradable polymers as binders for impregnating or coating fibrous fabrics. The resulting fabric is biodegradable so that the fiber in the fabric can be easily reused. The binder polymers described have molecular weights of more than 30,000, in particular more than 50,000, and include, for example, polymers of lactic acid, glycolic acid, hydroxybutyric acid and hydroxyvaleric acid.

DE 44 16 357 A1 describes a wound cover for medical use consisting of a support material of vegetable and/or animal fibers and/or fibers of polymer materials, and a polymer material which essentially coats and/or reinforces the fibers, the polymer material consisting of a poly(hydroxybutyric acid) which makes up between 1 and 50% by mass, based on the total mass of the wound cover.

SUMMARY OF THE INVENTION

Textile fiber fleeces are a frequently used construction material in the automobile field and have a broad range of properties. For example, phenol resin bonded textile fleece has long been employed as a material for structural and covered parts (alone or as a composite material) in the automobile industry in the construction of passenger cars and trucks, due to, inter alia, its good attenuation properties. Being an inexpensive sheet material, this product at first exclusively served for cushioning purposes. More recently, however, this material became available in a number of variants and can be employed in a wide variety of uses. Molded parts are particularly preferred.

Phenol resin bonded textile fleece is commercially available in bulk densities of from 50 to 1000 kg/cm³ and in thicknesses of from 5 to 30 mm. It may be described as a so-called porous composite consisting of three phases (cotton, cured phenol resin, and air)—a construction material whose profile of properties can be widely modified. Cotton is fibrous, phenol resin is present as discrete particles and also in the form of a flat network, as a kind of matrix.

By a particular selection of the non-woven (fleece) materials, the acoustic properties and the strength of the composite material can be particularly controlled. Especially preferred materials for the preparation of the non-woven material are glass-fiber reinforced or glass-mat reinforced fibrous materials, especially binder-containing textile fleeces, preferably those consisting of a cotton mixed fabric. Such fleeces are given the desired strength by pressing at an elevated temperature.

The particular properties and the performance of this last group of products are accounted for by the chemical and morphological structure of cotton and the thermoset character of the cured phenol resins which are usually employed as the binders for the cotton mixed fabric fleeces. Other factors affecting the properties are the deformability, the fastness to ironing of the cotton, the statistical abundance of bonding points, and the laminate and/or sheathing effect of the binder molecules adhering along the fibers and being condensed in this way.

The cotton will withstand the manufacturing process virtually without any change of its characteristic physicochemical properties. It confers specific quality features to the product, such as sound absorbability, good values of mechanical strength, impact resistance and resistance to shattering in the cold.

Particularly preferred binders for the non-woven materials are selected from phenol-formaldehyde resins, epoxy resins, polyester resins, polyamide resins, polypropylene, polyethylene and/or ethyl/vinyl acetate copolymers. After curing, phenol resins have the typical properties of thermoset plastics which are transferred to the finished product. The textile fleece is usually prepared dry from reprocessed cotton and powdery phenol resin. The curing is effected either in a heating flue or in a press via the uncured semifinished product as an intermediate. Selected textile is employed for the parts to be used in the passenger compartment.

Further, wood-fiber fleece materials are known as a wood material which is prepared by processing cut and chopped offal timber into a pulp using compressed steam and heat. This involves the breaking up of some cellulose bonds. Usually, small amounts of synthetic resin binders (e.g., phenol, alkyl, urea resins), flame-retardants, pesticides (against insects and fungal attack) and the like are added to the pulp, which is formed on molding machines into mostly sheet-like fiber boards, and dehydrated.

If such wood-fiber fleece materials are used as insulating materials against cold, heat and sound, as partition walls, table and floor coverings etc., they are also coated with varnish or with a synthetic resin film.

In the course of the manufacturing process, the wood-fiber material is molded, densified and compressed. This primarily uses the entangling of the fibers and their natural binding force. By adding binders and hydrophobizing agents and by thermal and other after-treatments, the binding forces can be increased. Thus, the physical and strength properties can be adapted to the intended use.

According to DIN 68753, the following kinds of wood-fiber materials are distinguished:

wood-fiber hardboards having a bulk density of more than 800 kg/m³;

medium-hard wood-fiber boards having a bulk density of more than 350 kg/m³ and up to 800 kg/m³; and porous wood-fiber fleece materials, also called wood-fiber damp slabs, having a bulk density of from 250 to 350 kg/m³.

From Derwent Abstract 90-168 964 and the corresponding JP-A-0 211 15 03, there are known molded parts consisting of wood fibers and binders as well as glass-fiber mats in a laminated condition. The molded part is used for interior trim parts for automobiles and electrical switch cupboards. The material is said to have good dimensional stability and improved strength as well as acoustic absorption properties.

The woody molding composition is prepared by adding 5 to 30% by weight of a phenolic binder for bonding the woody fibers. Glass-fiber mats are also obtained by impregnating the glass fibers with a phenol resin solution, followed by drying. The glass-fiber mats are then placed on a porous sheet, and the woody molding composition is sprayed onto the mat. After the woody molding composition has reached the desired thickness, spraying is stopped, and a sheet is applied to obtain a composite material. The latter is shaped in a mold with pressure to give a motor vehicle roof liner base material.

Further, a large number of bacteria are known to store large amounts of poly(hydroxyfatty acids) intracellularly under appropriate growth conditions in which an excess of a carbon source is present in the medium along with a deficiency of an essential nutrient salt. A survey is given in A. Steinbüchel, "Polyhydroxyalkanoic acids", in: D. Byrom (ed.), Biomaterials, Macmillan Publishers Ltd., Basingstoke, p. 123–213 (1991). These poly(hydroxyfatty acids) are usually linear polyesters of 3-hydroxyfatty acids; in a few cases, there are also found 4-hydroxy- or 5-hydroxyfatty acid monomers. The properties of the bacterial polymers are critically dependent on the length of the monomer side chain and on the monomer combinations. Thus, poly(3-hydroxybutyric acid) (PHB) is hard and brittle whereas poly(3-hydroxydecanoic acid) (PHD) has elastomeric properties. The polyesters mostly consist of units of several monomers having different compositions. With some polymers, such as co-poly(3-hydroxybutyric acid/3-hydroxyvaleric acid) (PHB/HV), the molar composition can be controlled in the microbiological production by the addition of different carbon sources. With other polymers, such as PHD (consisting of 30 mole percent of 3-hydroxyoctanoate, 50 mole percent of 3-hydroxydecanoate, 10 mole percent of 3-hydroxydodecanoate and other saturated and unsaturated 3-hydroxyfatty acids), the variability is highly limited in part. However, there are no technical applications of these polymers.

DETAILED DESCRIPTION OF EMBODIMENTS OF THE INVENTION

It has been the object of the present invention to employ the mentioned poly(hydroxyfatty acids), and partially also new ones, for a new application in the automobile field in the form of a binder for composite materials which exhibits improved biodegradability over that of phenol resins, can be readily prepared from natural raw materials, and ensures the same or increased mechanical stability of the composite material as compared with known materials of the automobile field.

Surprisingly, it has been found that polymers of hydroxyfatty acids are suitable as binders for composite materials in the automobile field.

Accordingly, in a first embodiment, the present invention relates to the use of a composite material made of a fibrous material and binders in the form of a polymer of hydroxyfatty acids for the preparation of molded parts in the automobile field, in particular, for acoustic attenuation in the areas of the hood, bulkhead (on both sides), tunnel, door, roof, footwell, pumps, A to D pillars and air distribution duct, and as an optionally self-supporting base for interior trims, especially for instrument panel covers, tunnel linings, door trims, seat back linings, A to D pillar linings and spare wheel covers, and as parts with a double function, especially as roof liner, rear shelf, filling piece, trunk mat or undershield.

By means of the present invention, it is possible to provide novel biodegradable composite materials for the automobile field.

Due to their specific properties, such as high rigidity, the composite materials are particularly suitable for the preparation of textile fiber fleeces, especially glass-fiber reinforced or glass-mat reinforced fibrous materials and cotton fleeces. It is possible to partly or completely replace the usually employed phenol resin binders.

The employed binder confers acoustic properties to the composite materials which result from the porosity of the material and which make the materials particularly suitable for the automobile field.

Composite materials according to the present invention preferably contain natural fibers, especially selected from flax, sisal, hemp, wood wool, mechanical wood pulp, wood fibers, coirs, cotton wad, hay, straw, sawdust, wood shavings, pine chips, glumes of grains, seed scraps, oat flakes, cereals, bran, paper strips and cotton scraps, but also synthetic fibers, such as polybutylene terephthalates, polyethylene terephthalates, nylon 6, nylon 66, nylon 12, viscose or rayon as a textile fiber.

The polymers of hydroxyfatty acids which, according to the present invention, are employed as binders in composite materials are preferably derived from saturated or unsaturated 3-hydroxyfatty acids having from 4 to 16 carbon atoms in the fatty acid residue. If the chain length of the fatty acid residue is selected too short, for example, through the biological conditions in the production of the polymers, the polymer will become too brittle, whereas a long carbon residue results in the strength of the material being reduced.

In addition to homopolymers of one monomer of hydroxyfatty acids, it is possible, for example, by selecting the microbiological conditions, to obtain mixtures of poly (hydroxyfatty acids) and thus copolymers or even terpolymers.

It is particularly preferred that the polymer of hydroxyfatty acids consist of poly(3-hydroxybutyric acid) (PHB), poly(3-hydroxybutyric acid/3-hydroxyvaleric acid) copolymer (PHB/HV) in about equimolar proportions, and poly(3-hydroxydecanoic acid), or mixtures thereof.

The kind and quantity of the binders to be used are essentially determined by the intended use of the composite material. Thus, in general, the use of from 5 to 50% by weight, especially from 20 to 40% by weight, based on the composite material, will be appropriate. In case further, per se customary binders are to be employed in the composite material, it is possible, however, to reduce the amount of the binder according to the invention.

The core of the present invention is the particular suitability of the polymers of hydroxyfatty acids for the preparation of composite materials in the automobile field. It is particularly preferred to use the composite materials according to the invention for acoustic attenuation in the areas of the hood, bulkhead (on both sides), tunnel, door, roof, footwell and air distribution duct, and optionally as a self-supporting base for interior trims, especially for instrument panel covers, tunnel linings, door trims, seat back linings and spare wheel covers, and for parts with a double function, especially as roof liner, rear shelf, filling piece, trunk mat and undershield.

The mentioned composite materials can be obtained by contacting the fibrous material with the binder, followed by pressing to give the composite material. The fibrous materials are suitably combined with the binders, and the composite materials are obtained by pressing at a temperature in the range of room temperature or above the melting range of the binder, but below the decomposition range of the binder. A range of temperatures of from 120 to 250° C., especially 180 to 250° C., is particularly preferred according to the present invention, since composite materials used to date in the prior art, especially textile fiber fleeces, are also pressed at such a temperature in the automobile field.

The microbiological preparation of the polymers of hydroxyfatty acids using microorganisms is known per se. For this purpose, it is possible to employ the microorganisms which are freely commercially available and to propagate them by suitable methods.

One possible method for the preparation of the composite materials consists in mixing the fibrous material with an isolated and purified polymer of hydroxyfatty acids, and pressing at an appropriately controlled temperature. A particularly pure, optically appealing composite material is thereby obtained which can be used in the visible area, optionally without any backing.

Another possibility of preparing the composite materials consists in mixing the fibrous material with dried microorganisms containing a polymer of hydroxyfatty acids or a paste made therefrom. Thus, in this case, the microorganism is not freed from the polymers of hydroxyfatty acids, but incorporated in the composite material along with it.

A variant, according to the invention, of the preparation process consists in growing the microorganisms producing polymers of hydroxyfatty acids in the presence of the fibrous material of the composite materials to be prepared and another carbon source, harvesting the bacteria along with the fibers, and pressing in a dried or moist condition, optionally using additional fibrous materials, into composite materials. Thus, in this embodiment, the fibrous material itself is partly employed as a nutrient for the microorganisms. With this procedure, the release of PHF granules from cells of *Alcaligenes eutrophus* has been observed in the presence of finely divided cellulose fibers.

Another possibility, according to the invention, of preparing the composite materials consists in growing the microorganisms without a further carbon source, the fibrous material serving as the sole carbon source.

It is particularly preferred according to the present invention to employ a PHF-synthetic gene expressing recombinant microorganism.

The present invention will be further illustrated by means of the following Examples:

EXAMPLES

Example 1

The ability to prepare poly(3-hydroxydecanoic acid) (PHD) is limited to the taxonomic group of the pseudomonads. However, since polyesters such as PHD or the closely related poly(3-hydroxy octanoate) (PHO) have not been prepared in larger amounts as yet, a suitable strain for the production thereof had first to be found. For this purpose, freely commercially available strains of the genus Pseudomonas were first tested for the utilization of inexpensive substrates, such as gluconate, glucose or saccharose (common sugar), both on solid media and in liquid culture (Table 1). For the culture, a defined mineral medium according to Schlegel et al. (1961) having the composition as given below was employed.

The strains mentioned below in the Table are freely accessible to the public since they are maintained with the Deutsche Sammlung von Mikroorganismen und Zellkulturen (DSM) of Braunschweig, Germany. Instead of the strains mentioned, other deposited strains also lead to comparable results.

TABLE 1

Fermentation conditions for the preparation of PHD in different Pseudomonas species

| Organism | Substrate[a] | Medium[b] | Duration (h) | Culture volume (l) | Dry weight (g/l) | PHF (% CDM) | PHF (g/l) |
| --- | --- | --- | --- | --- | --- | --- | --- |
| 1 *P. putida* KT2442 | 10% gluconate | 30 × MM | 72 | 7 | 18.0 | 2.6 | 0.4 |
| 2 *P. mendocina* (DSM 50017) | 10% gluconate | 2 × NH$_4$Cl<br>3 × Mg/Ca/Fe<br>3 × SL6 | 93 | 30 | 8.5 | 47.5 | 4.0 |
| 3 *P. citronellolis* (DSM 50332) | 6% gluconate | 2 × NH$_4$Cl<br>2 × Mg/Ca/Fe<br>2 × SL6 | 75 | 8 | 6.9 | 85.7 | 5.8 |
| 4 *P. citronellolis* (DSM 50332) | 3% gluconate | 1.5 × NH$_4$Cl<br>2 × Mg/Ca/Fe<br>2 × SL6 | 95 | 30 | 3.2 | 73.6 | 2.3 |
| 5 *P sp.* (DSM 1650) | 4% saccharose | 1 × MM | 48 | 8 | 3.0 | 27.5 | 0.8 |
| 6 *P. putida* KT2442 | 4% gluconate | 1 × MM | 24 | 250 | 3.4 | 62.1 | 2.1 |
| 7 *P. putida* KT2442 | 4% gluconate | 1 × MM<br>1.5 × NH$_4$Cl | 36 | 250 | 4.4 | 72.8 | 3.2 |
| 8 *A. eutrophus* H16 (DSM 428) | 4% gluconate | 2 × MM | 43 | 250 | 9.4 | 73.2 | 6.9 |
| 9 *A. eutrophus* H16 (DSM 428) | 2% gluconate<br>1% valerate | 2 × MM | 58 | 250 | 5.6 | 69.1 | 3.9 |

[a] The substrates were added in 2% (w/v) portions.
[b] The amount of the respective substance given in the literature (Schlegel et al., 1961) is calculated as 1 × . SL, trace element solution SL6. The abbreviations of the substances relate to the corresponding salts (see medium). CDM, cellular dry mass.

Mineral medium (Schlegel et al., 1961):

Na$_2$HPO$_4$.12H$_2$O=9.00 g

KH$_2$PO$_4$=1.50 g

NH$_4$Cl=1.00 g

MgSO$_4$.H$_2$O=0.20 g

CaCl$_2$.H$_2$O=0.02 g

Fe(III)NH$_4$ citrate=1.20 g

SL6 (Pfennig, N., 1974)=0.10 ml

H$_2$O$_{bidest}$=ad 1000 ml, pH 6.9

In the experiments, attention was paid to, in particular, the speed of growth and of polymer storage, and to reduced foaming. Considering additionally statements made in the literature (Haywood, G. W., Anderson, A. J., & Dawes, E. A. (1989b), "A survey of the accumulation of novel polyhydroxyalkanoates by bacteria", Biotechnol. Lett. 11, 471–476; Huisman, G. W., De Leeuw, O., Eggink, G., & Witholt, B. (1989), "Synthesis of poly-3-hydroxyalkanoates is a common feature of fluorescent pseudomonads", Appl. Environ. Microbiol. 55, 1949–1954; Timm, A., & Steinbüchel, A. (1990), "Formation of polyesters consisting of medium-chainlength 3-hydroxyalkanoic acids from gluconate by *Pseudomonas aeruginosa* and other fluorescent pseudomonads", Appl. Environ. 56, 3360–3367), the strains *P. putida* KT 2442, *P. citronellolis, P. mendocina*, P. sp. 15a and P. sp. 45C, in particular, were selected as possible microorganisms for the preparation of PHF. In experiments conducted in parallel using glucose or gluconate as the carbon source, it was found that gluconate is usually a better substrate for the synthesis of PHF.

Four of these strains were grown in test fermentations on a 10 l and 30 l scale (Table 1). A preparation process using *P. putida* KT 2442 and gluconate as the carbon source first proved to be favorable since the polymer content in this strain was very high at an early time in the phase of logarithmic growth already. Since the other strains examined synthesized PHF only in a later course of growth, the process using *P. putida* KT 2442 could be performed with a significantly lower expenditure of time. Although the fermentations stated under 2 and 3 in Table 1 with *P. mendocina* and *P. citronellolis* gave higher yields of cellular dry mass and more PHF per liter of culture, they required higher amounts of nutrient salts and gluconate, in addition to the higher expenditure of time. *P. putida* KT 2442 could also be grown to higher cell densities than those described under 5 and 6 (Table 1) as shown by fermentation 1 (Table 1).

Difficulties in the fermentations with pseudomonads resided in an almost uncontrollable formation of foam when the pH value of the medium moved to the alcaline range of pH values as sodium gluconate was consumed. It was possible to reduce the foaming of the culture, which resulted in a considerable loss of the cell mass formed by exportation of the biomass off the bioreactor, by additional titrating with concentrated phosphoric acid, adding high amounts of defoaming agents (polypropylene glycol, neat) and a low number of revolutions of the stirrer. However, these measures involve the risk of damaging the bacteria by too high concentrations of chemicals. Low numbers of revolutions of the stirrer lead to low oxygen concentrations which slow down or prevent the process of storing PHD.

Example 2

For producing PHD, about 1 kg of lyophilized cells of *P. putida* KT 2442 from cultures No. 6 and 7 (Table 1) was extracted in a Soxhlet extractor with 7.5 l of chloroform for seven days. The PHF-containing chloroform solution was concentrated in a rotary evaporator, and the polymer was isolated by precipitation in a tenfold volume of ethanol according to Lageveen, R. G., Huisman, G. W., Preusting, H., Ketelaar, P., Eggink, G., & Witholt, B. (1988), "Formation of polyesters by pseudomonas oleovorans: effect of substrates on formation and composition of poly-(R)-3-hydroxyalkanoates and poly-(R)-3-hydroxyalkenoates", Appl. Environ. Microbiol. 54, 2924–2932. About 360 g of purified PHD resulted, corresponding to a recovery of about 55% of the possible value.

The most favorable amount for pressing fiber materials was established to be an amount of 3 g since this amount well utilized the capacity of the pressing cell, and a pressed part of sufficient thickness resulted. Due to the rubbery consistency of the PHD, it was dissolved in chloroform in order to ensure sufficient distribution of the polymer within the fibrous material, and all fibers were uniformly wetted with this solution.

A volume of 20 ml of chloroform (with sisal, 5 ml, with wood wool and hemp, 10 ml) was sufficient to be completely taken up by 3 g of fibrous material. Therefore, solutions of from 0.5 to 20% (w/v) of PHF (PHB, see Table 2, PHD, see Table 3, mixtures of PHFs, see Table 4) in chloroform were prepared, the fibrous material was added, and the solvent was removed by evaporation overnight. The PHD wetted fibers were then pressed under the conditions given in Tables 2 to 5. Thus, 2 to 10% PHD solutions turned out to be evidently the most suitable concentrations for the preparation of composite materials from PHD and cotton scraps, flax or sisal or hemp. Thus, the pressed parts had PHD contents of between 11 and 40%. When cotton wad was used, the polymer exited from the cell at low concentrations already, and polymer contents of between 6 and 14% appeared to be favorable. The results are summarized in Tables 2 to 5.

TABLE 2

Preparation of pressed specimens from isolated PHB (consisting of 100 mole percent of polymeric 3-hydroxybutyrate) and various fibrous materials

| Fibrous material (g) | CHCl$_3$ (ml) | PHB (g) | solution (%) | PHB content (%) | pressure (bar) | time (min) | temp. of cell (° C.) | remarks |
|---|---|---|---|---|---|---|---|---|
| Cotton scraps | | | | | | | | |
| 3 | 0 | 0.23 | — | 7.1 | 200 | 5 | 180 | – w/o solvent |
| 3 | 0 | 0.30 | — | 9.1 | 200 | 5 | 180 | – w/o solvent |
| 3 | 0 | 0.45 | — | 13.1 | 200 | 5 | 180 | +/– w/o solvent |
| 3 | 0 | 0.60 | — | 16.7 | 200 | 5 | 180 | +/– w/o solvent |
| 3 | 20* | 0.5 | 2.5 | 14.3 | 200 | 5 | 180 | aqueous suspension |
| 3 | 20* | 1.0 | 5.0 | 25.0 | 200 | 5 | 180 | aqueous suspension |
| 3 | 0 | 0 | — | 0 | 200 | 5 | 180 | – blank |
| 3 | 20 | 0.4 | 2.0 | 11.8 | 200 | 5 | 180 | ++ |
| 3 | 20 | 1.0 | 5.0 | 25.0 | 200 | 5 | 180 | +++ |
| 3 | 20 | 1.5 | 7.5 | 33.3 | 200 | 5 | 180 | +++ too much polymer |
| 3 | 20 | 2.0 | 10.0 | 40.0 | 200 | 5 | 180 | +++ too much polymer |
| 3 | 20 | 0.05 | 0.25 | 1.6 | 200 | 5 | 180 | – |
| 3 | 20 | 0.1 | 0.5 | 3.2 | 200 | 5 | 180 | +/– |
| 3 | 20 | 0.2 | 1.0 | 6.2 | 200 | 5 | 180 | +/– |
| 3 | 20 | 0.3 | 1.5 | 9.1 | 200 | 5 | 180 | + |
| Flax | | | | | | | | |

TABLE 2-continued

Preparation of pressed specimens from isolated PHB (consisting of 100 mole percent of polymeric 3-hydroxybutyrate) and various fibrous materials

| Fibrous material (g) | CHCl$_3$ (ml) | PHB (g) | solution (%) | PHB content (%) | pressure (bar) | time (min) | temp. of cell (° C.) | remarks |
|---|---|---|---|---|---|---|---|---|
| 3 | 20 | 0.33 | 1.65 | 9.9 | 200 | 5 | 180 | ++ |
| 3 | 20 | 0.75 | 3.75 | 20.0 | 200 | 5 | 180 | +++ |
| Sisal | | | | | | | | |
| 3 | 5 | 0.33 | 6.6 | 9.9 | 200 | 5 | 180 | ++ |
| 3 | 5 | 0.75 | 14.0 | 20.0 | 200 | 5 | 180 | +++ |
| Hemp | | | | | | | | |
| 3 | 10 | 0.33 | 3.3 | 9.9 | 200 | 5 | 180 | ++ |
| 3 | 10 | 0.75 | 7.5 | 20.0 | 200 | 5 | 180 | +++ |
| Wood wool | | | | | | | | |
| 3 | 10 | 0.33 | 3.3 | 9.9 | 200 | 5 | 180 | ++ |
| 3 | 10 | 0.75 | 7.5 | 20.0 | 200 | 5 | 180 | +++ |
| Cotton wad | | | | | | | | |
| 3 | 20 | 0.33 | 1.65 | 9.9 | 200 | 5 | 180 | ++ |
| 3 | 20 | 0.75 | 3.75 | 20.0 | 200 | 5 | 180 | +++ |
| Hay | | | | | | | | |
| 3 | 5 | 0.33 | 6.6 | 9.9 | 200 | 5 | 180 | ++ |
| 3 | 5 | 0.75 | 14.0 | 20.0 | 200 | 5 | 180 | +++ |
| Straw | | | | | | | | |
| 3 | 5 | 0.33 | 6.6 | 9.9 | 200 | 5 | 180 | ++ |
| 3 | 5 | 0.75 | 14.0 | 20.0 | 200 | 5 | 180 | +++ |
| Sawdust | | | | | | | | |
| 6 | 20 | 0.66 | 3.3 | 9.9 | 200 | 5 | 180 | ++ |
| 6 | 20 | 1.5 | 7.5 | 20.0 | 200 | 5 | 180 | +++ |
| Glumes of grains | | | | | | | | |
| 6 | 20 | 0.66 | 3.3 | 9.9 | 200 | 5 | 180 | ++ |
| 6 | 20 | 1.5 | 7.5 | 20.0 | 200 | 5 | 180 | +++ |
| Wood shavings | | | | | | | | |
| 6 | 20 | 0.66 | 3.3 | 9.9 | 200 | 5 | 180 | ++ |
| 6 | 20 | 1.5 | 7.5 | 20.0 | 200 | 5 | 180 | +++ |
| Pine chips | | | | | | | | |
| 6 | 20 | 0.66 | 3.3 | 9.9 | 200 | 5 | 180 | ++ |
| 6 | 20 | 1.5 | 7.5 | 20.0 | 200 | 5 | 180 | +++ |
| Seed scraps | | | | | | | | |
| 12 | 10 | 1.32 | 13.2 | 9.9 | 200 | 5 | 180 | − oil emerges |
| Oat flakes | | | | | | | | |
| 12 | 10 | 1.32 | 13.2 | 9.9 | 200 | 5 | 180 | − |
| Rye | | | | | | | | |
| 12 | 10 | 1.32 | 13.2 | 9.9 | 200 | 5 | 180 | − |
| Bran | | | | | | | | |
| 6 | 10 | 0.66 | 6.6 | 9.9 | 200 | 5 | 180 | + |
| Paper strips | | | | | | | | |
| 6 | 10 | 0.66 | 6.6 | 9.9 | 200 | 5 | 180 | ++ |
| 6 | 10 | 1.5 | 15.0 | 20.0 | 200 | 5 | 180 | +++ |

Evaluation: − unsuitable; + suitable; ++ well suitable; +++ very well suitable; − combination of fibrous material and poly(hydroxyfatty acid(s)) can be formed into pressed parts with uniform distribution of the two components and high strength
*solvent: water

TABLE 3

Preparation of pressed specimens from isolated PHD (consisting of 3 mole percent of polymeric 3-hydroxyhexanoate, 20 mole percent of polymeric 3-hydroxyoctanoate, 75 mole percent of polymeric 3-hydroxydecanoate and 2 mole percent of polymeric 3-hydroxydodecanoate) and various fibrous materials

| Fibrous material (g) | CHCl$_3$ (ml) | PHD (g) | solution (%) | PHD content (%) | pressure (bar) | time (min) | temp. of cell (° C.) | remarks |
|---|---|---|---|---|---|---|---|---|
| Cotton scraps | | | | | | | | |
| 1 | 0 | 1.0 | — | 50.0 | 200 | 5 | 75 | − w/o solvent |
| 3 | 0 | 0.5 | — | 14.3 | 200 | 5 | 75 | − w/o solvent |
| 3 | 20 | 0 | 0 | 0 | 200 | 5 | 75 | − blank |
| 3 | 20 | 0.1 | 0.5 | 3.2 | 200 | 5 | 75 | − too little polymer |
| 3 | 20 | 0.2 | 1.0 | 6.2 | 200 | 5 | 75 | +/− too little polymer |
| 3 | 20 | 0.4 | 2.0 | 11.8 | 200 | 5 | 75 | ++ |
| 3 | 20 | 1.0 | 5.0 | 25.0 | 200 | 5 | 75 | +++ |
| 3 | 20 | 1.5 | 7.5 | 33.3 | 200 | 5 | 75 | +++ |
| 3 | 20 | 2.0 | 10.0 | 40.0 | 200 | 5 | 75 | +++ |
| 3 | 20 | 3.0 | 15.0 | 50.0 | 200 | 5 | 75 | +++ too much polymer |
| 3 | 20 | 4.0 | 20.0 | 57.1 | 200 | 5 | 75 | +++ too much polymer |
| Flax | | | | | | | | |
| 3 | 20 | 0 | 0 | 0 | 200 | 5 | 75 | − blank |
| 3 | 20 | 0.1 | 0.5 | 3.2 | 200 | 5 | 75 | − too little polymer |
| 3 | 20 | 0.2 | 1.0 | 6.2 | 200 | 5 | 75 | +/− too little polymer |
| 3 | 20 | 0.4 | 2.0 | 11.8 | 200 | 5 | 75 | ++ |
| 3 | 20 | 1.0 | 5.0 | 25.0 | 200 | 5 | 75 | +++ |
| 3 | 20 | 1.5 | 7.5 | 33.3 | 200 | 5 | 75 | +++ |
| 3 | 20 | 2.0 | 10.0 | 40.0 | 200 | 5 | 75 | +++ |
| 3 | 20 | 3.0 | 15.0 | 50.0 | 200 | 5 | 75 | +++ too much polymer |
| 3 | 20 | 4.0 | 20.0 | 57.1 | 200 | 5 | 75 | +++ too much polymer |
| Sisal | | | | | | | | |
| 3 | 5 | 0 | 0 | 0 | 200 | 5 | 75 | − blank |
| 3 | 5 | 0.1 | 2 | 3.2 | 200 | 5 | 75 | − |
| 3 | 5 | 0.25 | 5 | 7.7 | 200 | 5 | 75 | +/− |
| 3 | 5 | 0.37 | 7.5 | 11.0 | 200 | 5 | 75 | + |
| 3 | 5 | 0.5 | 10 | 14.3 | 200 | 5 | 75 | +++ |
| 3 | 5 | 0.75 | 15 | 20.0 | 200 | 5 | 75 | +++ |
| 3 | 5 | 1.0 | 20 | 25.0 | 200 | 5 | 75 | +++ |
| Hemp | | | | | | | | |
| 3 | 10 | 0 | 0 | 0 | 200 | 5 | 75 | − blank |
| 3 | 10 | 0.2 | 2 | 6.2 | 200 | 5 | 75 | +/− |
| 3 | 10 | 0.5 | 5 | 14.3 | 200 | 5 | 75 | +++ |
| 3 | 10 | 0.75 | 7.5 | 20.0 | 200 | 5 | 75 | +++ |
| 3 | 10 | 1.0 | 10 | 25.0 | 200 | 5 | 75 | +++ |
| Wood wool | | | | | | | | |
| 3 | 10 | 0 | 0 | 0 | 200 | 5 | 75 | − blank |
| 3 | 10 | 0.2 | 2 | 6.2 | 200 | 5 | 75 | − |
| 3 | 10 | 0.5 | 5 | 14.3 | 200 | 5 | 75 | + |
| 3 | 10 | 0.75 | 7.5 | 20.0 | 200 | 5 | 75 | ++ |
| 3 | 10 | 1.0 | 10 | 25.0 | 200 | 5 | 75 | +++ |
| Cotton wad | | | | | | | | |
| 3 | 20 | 0 | 0 | 0 | 200 | 5 | 75 | − blank |
| 3 | 20 | 0.4 | 2 | 11.8 | 200 | 5 | 75 | ++ |
| 3 | 20 | 1.0 | 5 | 25.0 | 200 | 5 | 75 | +++ |
| 3 | 20 | 2.0 | 10 | 40.0 | 200 | 5 | 75 | +++ too much polymer |
| 3 | 20 | 1.5 | 7.5 | 33.3 | 200 | 5 | 75 | +++ too much polymer |
| Hay | | | | | | | | |
| 3 | 5 | 0 | | | 200 | 5 | 75 | − blank |
| 3 | 5 | 0.37 | 7.4 | 11.0 | 200 | 5 | 75 | ++ |
| 3 | 5 | 0.5 | 10 | 14.3 | 200 | 5 | 75 | +++ |
| Straw | | | | | | | | |
| 3 | 5 | | | | 200 | 5 | 75 | − blank |
| 3 | 5 | 0.37 | 7.4 | 11.0 | 200 | 5 | 75 | + |
| 3 | 5 | 0.5 | 10 | 14.3 | 200 | 5 | 75 | +++ |
| Sawdust | | | | | | | | |
| 3 | 10 | 0 | | 0 | 200 | 5 | 75 | − blank |
| 3 | 10 | 0.33 | 3.3 | 9.9 | 200 | 5 | 75 | +/− |
| 3 | 10 | 0.75 | 7.5 | 20.0 | 200 | 5 | 75 | + |
| 6 | 20 | 0.66 | 3.3 | 9.9 | 200 | 5 | 75 | + |

TABLE 3-continued

Preparation of pressed specimens from isolated PHD (consisting of 3 mole percent of polymeric 3-hydroxyhexanoate, 20 mole percent of polymeric 3-hydroxyoctanoate, 75 mole percent of polymeric 3-hydroxydecanoate and 2 mole percent of polymeric 3-hydroxydodecanoate) and various fibrous materials

| Fibrous material (g) | CHCl₃ (ml) | PHD (g) | solution (%) | PHD content (%) | pressure (bar) | time (min) | temp. of cell (° C.) | remarks |
|---|---|---|---|---|---|---|---|---|
| 6 | 20 | 1.5 | 7.5 | 20.0 | 200 | 5 | 75 | ++ |
| Wood shavings | | | | | | | | |
| 3 | 10 | 0 | | 0 | 200 | 5 | 75 | – blank |
| 3 | 10 | 0.33 | 3.3 | 9.9 | 200 | 5 | 75 | +/– |
| 3 | 10 | 0.75 | 7.5 | 20.0 | 200 | 5 | 75 | ++ |
| 6 | 20 | 0.65 | 3.3 | 9.9 | 200 | 5 | 75 | ++ |
| 6 | 20 | 1.5 | 7.5 | 20.0 | 200 | 5 | 75 | ++ |
| Pine chips | | | | | | | | |
| 3 | 10 | 0 | | 0 | 200 | 5 | 75 | – blank |
| 3 | 10 | 0.33 | 3.3 | 9.9 | 200 | 5 | 75 | +/– |
| 3 | 10 | 0.75 | 7.5 | 20.0 | 200 | 5 | 75 | + |
| 6 | 20 | 0.66 | 3.3 | 9.9 | 200 | 5 | 75 | ++ |
| 6 | 20 | 1.5 | 7.5 | 20.0 | 200 | 5 | 75 | ++ |
| Glumes of grains | | | | | | | | |
| 3 | 10 | 0 | | 0 | 200 | 5 | 75 | – blank |
| 3 | 10 | 0.33 | 3.3 | 9.9 | 200 | 5 | 75 | +/– |
| 3 | 10 | 0.75 | 7.5 | 20.0 | 200 | 5 | 75 | + |
| 6 | 20 | 0.66 | 3.3 | 9.9 | 200 | 5 | 75 | ++ |
| 6 | 20 | 1.50 | 7.5 | 20.0 | 200 | 5 | 75 | ++ |
| Seed scraps | | | | | | | | |
| 12 | 5 | 0 | | 0 | 200 | 5 | 75 | – blank |
| 12 | 5 | 0.33 | 6.6 | 2.7 | 200 | 5 | 75 | – oil emerges |
| 12 | 5 | 0.75 | 15.0 | 5.9 | 200 | 5 | 75 | – oil emerges |
| 12 | 10 | 3.00 | 30.0 | 20.0 | 200 | 5 | 75 | +/– oil emerges |
| 12 | 10 | 1.37 | 13.7 | 10.2 | 200 | 5 | 75 | +/– oil emerges |
| Oat flakes | | | | | | | | |
| 12 | 10 | 0 | | 0 | 200 | 5 | 75 | – blank |
| 12 | 10 | 0.33 | 3.3 | 2.7 | 200 | 5 | 75 | – |
| 12 | 10 | 0.75 | 7.5 | 5.9 | 200 | 5 | 75 | +/– |
| 12 | 10 | 1.37 | 13.7 | 10.2 | 200 | 5 | 75 | +/– |
| 12 | 10 | 3.00 | 30.0 | 20.0 | 200 | 5 | 75 | + |
| Rye | | | | | | | | |
| 12 | 10 | 0 | | 0 | 200 | 5 | 75 | – blank |
| 12 | 10 | 1.37 | 13.7 | 10.2 | 200 | 5 | 75 | +/– |
| 12 | 10 | 3.00 | 30.0 | 20.0 | 200 | 5 | 75 | +/– |
| Bran | | | | | | | | |
| 6 | 10 | 0 | | 0 | 200 | 5 | 75 | – blank |
| 6 | 10 | 0.66 | 6.6 | 9.9 | 200 | 5 | 75 | ++ |
| 6 | 10 | 1.50 | 15.0 | 20.0 | 200 | 5 | 75 | +/– |
| Paper Strips | | | | | | | | |
| 6 | 10 | 0 | | 10 | 200 | 5 | 75 | – blank |
| 6 | 10 | 0.66 | 6.6 | 9.9 | 200 | 5 | 75 | +/– |
| 6 | 10 | 1.50 | 15.0 | 20.0 | 200 | 5 | 75 | ++ |

TABLE 4

Preparation of pressed specimens from polymer mixtures (PHB/HV, containing 8% of HV) of poly(hydroxyfatty acids) and cotton scraps
The standard of assessment is the same as that of Table 2.

| Fibrous material (g) | CHCl₃ (ml) | PHF (g) | solution (%) | PHB content (%) | pressure (bar) | time (min) | temp. of cell (° C.) | remarks |
|---|---|---|---|---|---|---|---|---|
| 3 | 0 | 0.23 | — | 7.1 | 200 | 5 | 150 | +/– w/o solvent |
| 3 | 0 | 0.30 | — | 9.1 | 200 | 5 | 150 | + w/o solvent |
| 3 | 0 | 0.45 | — | 13.0 | 200 | 5 | 150 | +++ w/o solvent |
| 3 | 0 | 0.60 | — | 16.7 | 200 | 5 | 150 | +++ w/o solvent |
| 3 | 20 | 0.4 | 2.0 | 11.8 | 200 | 5 | 150 | ++ |

TABLE 4-continued

Preparation of pressed specimens from polymer mixtures (PHB/HV, containing 8% of HV) of poly(hydroxyfatty acids) and cotton scraps
The standard of assessment is the same as that of Table 2.

| Fibrous material (g) | CHCl₃ (ml) | PHF (g) | solution (%) | PHB content (%) | pressure (bar) | time (min) | temp. of cell (° C.) | remarks |
|---|---|---|---|---|---|---|---|---|
| 3 | 20 | 1.0 | 5.0 | 25.0 | 200 | 5 | 150 | +++ |
| 3 | 20 | 1.5 | 7.5 | 33.3 | 200 | 5 | 150 | +++ |
| 3 | 20 | 2.0 | 10.1 | 40.0 | 200 | 5 | 150 | +++ too much polymer |
| 3 | 20 | 0.05 | 0.25 | 1.6 | 200 | 5 | 150 | +/− |
| 3 | 20 | 0.1 | 0.5 | 3.2 | 200 | 5 | 150 | +/− |
| 3 | 20 | 0.2 | 1.0 | 6.2 | 200 | 5 | 150 | + |
| 3 | 20 | 0.3 | 1.5 | 9.1 | 200 | 5 | 150 | ++ |
| 3 | 20*) | 0.5 | — | 14.3 | 200 | 5 | 150 | ++ aqueous suspension |
| 3 | 20*) | 1.0 | — | 25.0 | 200 | 5 | 150 | +++ aqueous suspension |

TABLE 5

Preparation of pressed specimens from various polymers and cotton scraps and other natural materials
The standard of assessment is the same as that of Table 2.

| Fibrous material (g) | CHCl₃ (ml) | PHD (g) | solution (%) | polymer content (%) | pressure (bar) | time (min) | temp. of cell (° C.) | remarks |
|---|---|---|---|---|---|---|---|---|
| Biopol** | | | | | | | | |
| 3 | 20 | 0.4 | 2 | 13.3 | 200 | 5 | 150 | + |
| 3 | 20 | 1.0 | 5 | 33.3 | 200 | 5 | 150 | +++ |
| 3 | 20 | 1.5 | 7.5 | 50.0 | 200 | 5 | 150 | +++ too much polymer |
| 3 | 20 | 2.0 | 10 | 66.7 | 200 | 5 | 150 | +++ too much polymer |
| Flour | | | | | | | | |
| 3 | 20*) | 0.33 | 1.65 | 9.9 | 200 | 5 | 100 | +/− |
| 3 | 20*) | 0.75 | 3.75 | 20.0 | 200 | 5 | 100 | +/− |
| 3 | 20*) | 0.33 | 1.65 | 9.9 | 200 | 5 | 180 | + |
| 3 | 20*) | 0.75 | 3.75 | 20.0 | 200 | 5 | 180 | ++ |
| Coarse meal | | | | | | | | |
| 3 | 20*) | 0.33 | 1.65 | 9.9 | 200 | 5 | 100 | +/− |
| 3 | 20*) | 0.75 | 3.75 | 20.0 | 200 | 5 | 100 | +/− |
| 3 | 20*) | 0.33 | 1.65 | 9.9 | 200 | 5 | 180 | ++ |
| 3 | 20*) | 0.75 | 3.75 | 20.0 | 200 | 5 | 180 | +++ |
| Starch | | | | | | | | |
| 3 | 20*) | 0.33 | 1.65 | 9.9 | 200 | 5 | 100 | +/− |
| 3 | 20*) | 0.75 | 3.75 | 20.0 | 200 | 5 | 100 | +/− |
| 3 | 20*) | 0.33 | 1.65 | 9.9 | 200 | 5 | 180 | + |
| 3 | 20*) | 0.75 | 3.75 | 20.0 | 200 | 5 | 180 | ++ |

**as in Table 4, containing 18% of HV

PHD, PHB/HV with a content of 8 mole percent of 3-hydroxyvaleric acid (3 HV) and "Biopol", a natural polymeric material with a content of 18 mole percent of 3 HV, were also taken up in 20 ml of chloroform. This gave suspensions, since the polymers are sparingly soluble.

Example 3

In order to press bacteria with a significant proportion of PHF in the cellular dry mass directly without isolation of PHF along with the fibrous material, dried cells of *P. putida* from fermentation 6 (Table 1) with a proportion of 62% of polymer in the cellular dry mass were ground in a mortar to give a powder. This powder was admixed with the fibers as thoroughly as possible in varying amounts, and the mixture was pressed. The resulting pressed parts clearly showed that cohesion was ensured in zones with much cellular material whereas the material was very loose in regions without cellular material.

In order to achieve a better distribution, appropriate amounts of cellular material were suspended in chloroform, incubated on a rotary shaker for about 1 hour, and mixed with the fibers. After evaporating the chloroform, the mixture was pressed. In this case too, the pressed parts did not show a homogeneous distribution of the cells, so that sufficient cohesion of the material was not ensured.

In a further experiment, the appropriate amounts of dried cells were resuspended in water, incubated on a rotary shaker for about 1 hour, and subsequently mixed with the fibrous material. This mixture was then lyophilized overnight and subsequently pressed. The resulting pressed parts exhibited a homogeneous distribution of cells and polymer so that this method appears to be particularly suitable for the preparation of composite materials. A mixing ratio of 9 to 30% of cells, corresponding to a polymer content of 6 to 24%, appeared favorable for the pressed parts. The results are summarized in Table 6.

TABLE 6

Preparation of pressed specimens from various fibrous materials and dried cells containing PHF (fermentation 14; PHB content 73%, composition: 10 mole percent of 3-hydroxybutyrate). The cells were resuspended in the stated volume (ml) of water, mixed with the fibers and lyophilized. The standard of assessment is the same as that of Table 2.

| Fibrous material (g/ml) | Cells (g) | PHB (g) | proportion of cells (%) | proportion of PHB (%) | pressure (bar) | time (min) | temp. of cell (° C.) | remarks |
|---|---|---|---|---|---|---|---|---|
| Cotton | | | | | | | | |
| 3 | 0.15 | 0.11 | 4.8 | 3.5 | 200 | 10 | 180 | + |
| 3 | 0.23 | 0.17 | 7.1 | 5.3 | 200 | 10 | 180 | ++ |
| 3 | 0.3 | 0.22 | 9.1 | 6.7 | 200 | 10 | 180 | ++ |
| 3 | 0.45 | 0.33 | 13.2 | 9.6 | 200 | 10 | 180 | +++ |
| Flax | | | | | | | | |
| 3/20 | 0.50 | 0.36 | 14.3 | 10.4 | 200 | 3 | 180 | ++ |
| 3/20 | 1.16 | 0.85 | 27.9 | 20.4 | 200 | 3 | 180 | +++ |
| Sisal | | | | | | | | |
| 3/5 | 0.50 | 0.36 | 14.3 | 10.4 | 200 | 3 | 180 | ++ |
| 3/5 | 1.16 | 0.85 | 27.9 | 20.4 | 200 | 3 | 180 | +++ |
| Hemp | | | | | | | | |
| 3/10 | 0.50 | 0.36 | 14.3 | 10.4 | 200 | 3 | 180 | ++ |
| 3/10 | 1.16 | 0.85 | 27.9 | 20.4 | 200 | 3 | 180 | +++ |
| Wood wool | | | | | | | | |
| 3/10 | 0.50 | 0.36 | 14.3 | 10.4 | 200 | 3 | 180 | ++ |
| 3/10 | 1.16 | 0.85 | 27.9 | 20.4 | 200 | 3 | 180 | +++ |
| Cotton wad | | | | | | | | |
| 3/10 | 0.50 | 0.36 | 14.3 | 10.4 | 200 | 3 | 180 | ++ |
| 3/10 | 1.16 | 0.85 | 27.9 | 20.4 | 200 | 3 | 180 | +++ |
| Hay | | | | | | | | |
| 3/5 | 0.50 | 0.36 | 14.3 | 10.4 | 200 | 3 | 180 | ++ |
| 3/5 | 1.16 | 0.85 | 27.9 | 20.4 | 200 | 3 | 180 | +++ |
| Straw | | | | | | | | |
| 3/5 | 0.50 | 0.36 | 14.3 | 10.4 | 200 | 3 | 180 | ++ |
| 3/5 | 1.16 | 0.85 | 27.9 | 20.4 | 200 | 3 | 180 | +++ |
| Sawdust | | | | | | | | |
| 6/10 | 1.00 | 0.73 | 14.3 | 10.4 | 200 | 3 | 180 | ++ |
| 6/10 | 2.32 | 1.69 | 27.9 | 20.4 | 200 | 3 | 180 | +++ |
| Wood shavings | | | | | | | | |
| 6/10 | 1.00 | 0.73 | 14.3 | 10.4 | 200 | 3 | 180 | ++ |
| 6/10 | 2.32 | 1.69 | 27.9 | 20.4 | 200 | 3 | 180 | +++ |
| Pine chips | | | | | | | | |
| 6/10 | 1.00 | 0.73 | 14.3 | 10.4 | 200 | 3 | 180 | ++ |
| 6/10 | 2.32 | 1.69 | 27.9 | 20.4 | 200 | 3 | 180 | +++ |
| Glumes of grains | | | | | | | | |
| 6/10 | 1.00 | 0.73 | 14.3 | 10.4 | 200 | 3 | 180 | ++ |
| 6/10 | 2.32 | 1.69 | 27.9 | 20.4 | 200 | 3 | 180 | +++ |
| Seed scraps | | | | | | | | |
| 12/5 | 2.00 | 1.46 | 14.3 | 10.4 | 200 | 3 | 75 | +/− |
| 12/5 | 4.64 | 3.39 | 27.9 | 20.4 | 200 | 3 | 75 | +/− |
| Oat flakes | | | | | | | | |
| 12/10 | 2.00 | 1.46 | 14.3 | 10.4 | 200 | 3 | 75 | + |
| 12/10 | 4.64 | 3.39 | 27.9 | 20.4 | 200 | 3 | 75 | + |
| Rye | | | | | | | | |
| 12/10 | 2.00 | 1.46 | 14.3 | 10.4 | 200 | 3 | 75 | + |
| Bran | | | | | | | | |
| 6/10 | 1.00 | 0.73 | 14.3 | 10.4 | 200 | 3 | 180 | ++ |
| 6/10 | 2.32 | 1.69 | 27.9 | 20.4 | 200 | 3 | 180 | +++ |

TABLE 6-continued

Preparation of pressed specimens from various fibrous materials and dried cells containing PHF (fermentation 14; PHB content 73%, composition: 10 mole percent of 3-hydroxybutyrate). The cells were resuspended in the stated volume (ml) of water, mixed with the fibers and lyophilized. The standard of assessment is the same as that of Table 2.

| Fibrous material (g/ml) | Cells (g) | PHB (g) | proportion of cells (%) | proportion of PHB (%) | pressure (bar) | time (min) | temp. of cell (° C.) | remarks |
|---|---|---|---|---|---|---|---|---|
| Paper strips | | | | | | | | |
| 6/10 | 1.00 | 0.73 | 14.3 | 10.4 | 200 | 3 | 180 | ++ |
| 6/10 | 2.32 | 1.69 | 27.9 | 20.4 | 200 | 3 | 180 | +++ |

Example 4

By analogy with Example 3, pressed parts of fibrous materials and dried cells which had stored PHD (fermentation 6) were prepared. The results are summarized in Table 7.

TABLE 7

Preparation of pressed specimens from various fibrous materials and dried cells which had stored PHF (fermentation 6; PHD content 62% with a composition of 3 mole percent of 3-hydroxyhexanoate, 20 mole percent of 3-hydroxyoctanoate, 75 mole percent of 3-hydroxydecanoate, and 2 mole percent of 3-hydroxydodecanoate). The standard of assessment is the same as that of Table 2.

| Fibrous material (g/ml) | Cells (g) | PHD (g) | proportion of cells (%) | proportion of PHD (%) | pressure (bar) | time (min) | temp. of cell (° C.) | remarks |
|---|---|---|---|---|---|---|---|---|
| Cotton scraps | \multicolumn{8}{dried cells from fermentation 6 were distributed in fibrous material} |
| 3/20 | 0.15 | 0.09 | 4.8 | 2.9 | 200 | 10 | 75 | − no homogeneous distribution |
| 3/20 | 0.23 | 0.14 | 7.1 | 4.3 | 200 | 10 | 75 | +/− no homogeneous distribution |
| 3/20 | 0.30 | 0.19 | 9.1 | 5.7 | 200 | 10 | 75 | +/− no homogeneous distribution |
| 3/20 | 0.45 | 0.28 | 13.0 | 8.1 | 200 | 10 | 75 | − no homogeneous distribution |
| 3/20 | 0.60 | 0.37 | 16.7 | 11.3 | 200 | 10 | 75 | + no homogeneous distribution |
| | cells from fermentation 6 were resuspended in 10 ml of chloroform, mixed with the fibers and pressed after drying | | | | | | | |
| 3/20 | 0.15 | 0.09 | 4.8 | 2.9 | 200 | 10 | 75 | − no homogeneous distribution |
| 3/20 | 0.23 | 0.14 | 7.1 | 4.3 | 200 | 10 | 75 | − no homogeneous distribution |
| 3/20 | 0.30 | 0.19 | 9.1 | 5.7 | 200 | 10 | 75 | − no homogeneous distribution |
| 3/20 | 0.45 | 0.28 | 13.0 | 8.1 | 200 | 10 | 75 | +/− no homogeneous distribution |
| 3/20 | 0.60 | 0.37 | 16.7 | 11.3 | 200 | 10 | 75 | + no homogeneous distribution |
| | cells from fermentation 6 were resuspended in 10 ml of water, mixed with the fibers and lyophilized | | | | | | | |
| 3/20 | 0 | 0 | 0 | 0 | 200 | 10 | 75 | − blank |
| 3/20 | 0.15 | 0.09 | 4.8 | 2.9 | 200 | 10 | 75 | − |
| 3/20 | 0.23 | 0.14 | 7.1 | 4.3 | 200 | 10 | 75 | +/− |
| 3/20 | 0.30 | 0.19 | 9.1 | 5.7 | 200 | 10 | 75 | + |
| 3/20 | 0.45 | 0.28 | 13.0 | 8.1 | 200 | 10 | 75 | ++ |
| 3/20 | 0.60 | 0.37 | 16.7 | 11.3 | 200 | 10 | 75 | +++ |
| 3/20 | 0.90 | 0.56 | 23.1 | 14.3 | 200 | 10 | 75 | +++ |
| 3/20 | 1.2 | 0.74 | 28.6 | 17.6 | 200 | 10 | 75 | +++ |
| Flax | | | | | | | | |
| 3/20 | 0 | 0 | 0 | 0 | 200 | 10 | 75 | − blank |
| 3/20 | 0.15 | 0.09 | 4.8 | 2.9 | 200 | 10 | 75 | − blank |

TABLE 7-continued

Preparation of pressed specimens from various fibrous materials and dried cells which had stored PHF (fermentation 6; PHD content 62% with a composition of 3 mole percent of 3-hydroxyhexanoate, 20 mole percent of 3-hydroxyoctanoate, 75 mole percent of 3-hydroxydecanoate, and 2 mole percent of 3-hydroxydodecanoate). The standard of assessment is the same as that of Table 2.

| Fibrous material (g/ml) | Cells (g) | PHD (g) | proportion of cells (%) | proportion of PHD (%) | pressure (bar) | time (min) | temp. of cell (°C) | remarks |
|---|---|---|---|---|---|---|---|---|
| 3/20 | 0.23 | 0.14 | 7.1 | 4.3 | 200 | 10 | 75 | +/− |
| 3/20 | 0.30 | 0.19 | 9.1 | 5.7 | 200 | 10 | 75 | + |
| 3/20 | 0.45 | 0.28 | 13.0 | 8.1 | 200 | 10 | 75 | ++ |
| 3/20 | 0.60 | 0.37 | 16.7 | 11.3 | 200 | 10 | 75 | +++ |
| 3/20 | 0.90 | 0.56 | 23.1 | 14.3 | 200 | 10 | 75 | +++ |
| 3/20 | 1.2 | 0.74 | 28.6 | 17.6 | 200 | 10 | 75 | +++ |
| 3/20 | 0.58 | 0.36 | 16.2 | 10.0 | 200 | 3 | 75 | ++ |
| 3/20 | 1.45 | 0.90 | 32.6 | 20.2 | 200 | 3 | 75 | +++ |
| Sisal | | | | | | | | |
| 3/5 | 0.58 | 0.36 | 16.2 | 10.0 | 200 | 3 | 75 | ++ |
| 3/5 | 1.45 | 0.90 | 32.6 | 20.2 | 200 | 3 | 75 | +++ |
| Hemp | | | | | | | | |
| 3/10 | 0.58 | 0.36 | 16.2 | 10.0 | 200 | 3 | 75 | ++ |
| 3/10 | 1.45 | 0.90 | 32.6 | 20.2 | 200 | 3 | 75 | +++ |
| Wood wool | | | | | | | | |
| 3/10 | 0.58 | 0.36 | 16.2 | 10.0 | 200 | 3 | 75 | + |
| 3/10 | 1.45 | 0.90 | 32.6 | 20.2 | 200 | 3 | 75 | +++ |
| Cotton wad | | | | | | | | |
| 3/10 | 0.58 | 0.36 | 16.2 | 10.0 | 200 | 3 | 75 | ++ |
| 3/10 | 1.45 | 0.90 | 32.6 | 20.2 | 200 | 3 | 75 | +++ |
| Hay | | | | | | | | |
| 3/5 | 0.58 | 0.36 | 16.2 | 10.0 | 200 | 3 | 75 | + |
| 3/5 | 1.45 | 0.90 | 32.6 | 20.2 | 200 | 3 | 75 | +++ |
| Straw | | | | | | | | |
| 3/5 | 0.58 | 0.36 | 16.2 | 10.0 | 200 | 3 | 75 | + |
| 3/5 | 1.45 | 0.90 | 32.6 | 20.2 | 200 | 3 | 75 | +++ |
| Sawdust | | | | | | | | |
| 6/10 | 1.16 | 0.72 | 16.2 | 10.0 | 200 | 3 | 75 | ++ |
| 6/10 | 2.90 | 1.80 | 32.6 | 20.2 | 200 | 3 | 75 | +++ |
| Wood shavings | | | | | | | | |
| 6/10 | 1.16 | 0.72 | 16.2 | 10.0 | 200 | 3 | 75 | ++ |
| 6/10 | 2.90 | 1.80 | 32.6 | 20.2 | 200 | 3 | 75 | +++ |
| Pine chips | | | | | | | | |
| 6/10 | 1.16 | 0.72 | 16.2 | 10.0 | 200 | 3 | 75 | ++ |
| 6/10 | 2.90 | 1.80 | 32.6 | 20.2 | 200 | 3 | 75 | +++ |
| Glumes of grains | | | | | | | | |
| 6/10 | 1.16 | 0.72 | 16.2 | 10.0 | 200 | 3 | 75 | ++ |
| 6/10 | 2.90 | 1.80 | 32.6 | 20.2 | 200 | 3 | 75 | +++ |
| Seed scraps | | | | | | | | |
| 12/5 | 2.32 | 1.44 | 16.2 | 10.0 | 200 | 3 | 75 | + |
| 12/5 | 5.80 | 3.60 | 32.6 | 20.2 | 200 | 3 | 75 | ++ |
| Oat flakes | | | | | | | | |
| 12/10 | 2.32 | 1.44 | 16.2 | 10.0 | 200 | 3 | 75 | + |
| 12/10 | 5.80 | 3.60 | 32.6 | 20.2 | 200 | 3 | 75 | ++ |
| Rye | | | | | | | | |
| 12/10 | 2.32 | 1.44 | 16.2 | 10.0 | 200 | 3 | 75 | + |
| 12/10 | 5.80 | 3.60 | 32.6 | 20.2 | 200 | 3 | 75 | ++ |
| Bran | | | | | | | | |
| 6/10 | 1.16 | 0.72 | 16.2 | 10.0 | 200 | 3 | 75 | ++ |
| 6/10 | 2.90 | 1.80 | 32.6 | 20.2 | 200 | 3 | 75 | +++ |

TABLE 7-continued

Preparation of pressed specimens from various fibrous materials and dried cells which had stored PHF (fermentation 6; PHD content 62% with a composition of 3 mole percent of 3-hydroxyhexanoate, 20 mole percent of 3-hydroxyoctanoate, 75 mole percent of 3-hydroxydecanoate, and 2 mole percent of 3-hydroxydodecanoate).
The standard of assessment is the same as that of Table 2.

| Fibrous material (g/ml) | Cells (g) | PHD (g) | proportion of cells (%) | proportion of PHD (%) | pressure (bar) | time (min) | temp. of cell (° C.) | remarks |
|---|---|---|---|---|---|---|---|---|
| Paper strips | | | | | | | | |
| 6/10 | 1.16 | 0.72 | 16.2 | 10.0 | 200 | 3 | 75 | ++ |
| 6/10 | 2.90 | 1.80 | 32.6 | 20.2 | 200 | 3 | 75 | +++ |

Example 5

By analogy with the procedure of Example 3, the culture broth of bacteria was directly mixed with the fibrous material, i.e. without lyophilization and subsequent resuspension, then lyophilized and subsequently pressed. Suitable microorganisms can be seen from Table 8.

TABLE 8

The standard of assessment is the same as that of Table 2

| Bacterium | Substrate | Fiber content | Assessment |
|---|---|---|---|
| — | — | cotton scraps | − |
| Rh. ruber | glucose | cotton scraps | +++ |
| Rh. ruber | glucose | cotton scraps | + |
| M. extorquens B65 | methanol | cotton scraps | + |
| M. extorquens B65 | methanol | cotton scraps | +/− |
| M. rhodesianum | methanol | cotton scraps | +/− |
| A. eutrophus H16 | gluconate | cotton scraps | ++ |
| A. eutrophus H16 | gluconate | cotton scraps | ++ |
| P. sp. GP4PH1 | gluconate | cotton scraps | +++ |
| P. sp. DSM1650 | gluconate | cotton scraps | +++ |

TABLE 8-continued

The standard of assessment is the same as that of Table 2

| Bacterium | Substrate | Fiber content | Assessment |
|---|---|---|---|
| P. putida KT2440 | gluconate | cotton scraps | − |
| P. putida KT2440 | octanoate | cotton scraps | − |

When the microorganisms are additionally lysed prior to the mixing by ultrasonic treatment, the pressed parts from charges with M. extorquens B65 showed "++".

Example 6

For examining the utilization of cellulosic substrates by bacteria capable of storing PHF according to Example 5, the bacteria were grown on various cellulosic materials. Various autoclaved fibrous materials were placed in liquid mineral medium and inoculated with bacteria from fresh NB agar cultures. From the increasing turbidity of the solution, which could also have been due to bacterial growth, the presence of a utilizable substrate in the nutrient broth could be concluded. The results are summarized in Table 9.

TABLE 9

Utilization of cellulosic fibrous materials by different bacteria according to Example 5.
The standard of assessment is the same as that of Table 2.

| | P. fluorescens var. cellulosa | | | | C. fimi | | | |
|---|---|---|---|---|---|---|---|---|
| Substrate | 1d | 2d | 4d | 7d | 1d | 2d | 4d | 7d |
| 1.0% glucose | +++ | | | | +++ | | | |
| 0.1% octanoate | − | − | − | − | − | − | +/− | +/− |
| Whatman paper | +/− | ++ a | +++ A | | + | ++ a | +++ A | |
| Whatman paper-YE | +/− | +/− | + | +++ A | − | − | − | − |
| Whatman paper + 1.0% glucose | ++ | +++ | | | +++ | | | |
| Whatman paper + 0.1% octanoate | − | − | − | − | − | − | +/− | +/− |
| cotton wad | − | − | +/− | + | +/− | + | + | +++ |
| cotton | − | +/− | + | ++ | +/− | + | ++ | ++ |
| cotton + 1.0% glucose | +++ | | | | ++ | +++ | | |
| cotton + 0.1% octanoate | − | − | − | − | +/− | +/− | +/− | + |
| flax | − | +/− | ++ | +++ A | +/− | +/− | ++ | ++ |
| sisal | + | + | + | ++ | + | + | ++ | ++ |
| wood wool | − | − | − | − | +/− | + | + | + |
| straw | + | + | ++ | ++ | +/− | + | ++ | +++ |
| hay | +/− | ++ | ++ | +++ | +/− | + | ++ | ++ |
| laser print | + | +++ a | +++ A | | + | +++ A | | |
| paper tissue | +/− | ++ a | +++ a | +++ a | + | +++ | +++ a | +++ a |
| magazine | +/− | + | ++ a | +++ a | + | + | +++ | +++ a |
| newspaper | +/− | + | + | ++ | +/− | +/− | + | + |

TABLE 9-continued

Utilization of cellulosic fibrous materials by different bacteria according to Example 5.
The standard of assessment is the same as that of Table 2.

|  | Rb. ruber | | | | S. marcescens | | | |
|---|---|---|---|---|---|---|---|---|
| Substrate | 1d | 2d | 4d | 7d | 1d | 2d | 4d | 7d |
| 1.0% glucose | ++ | +++ | | | +++ | | | |
| 0.1% octanoate | n.d. | | | | n.d. | | | |
| Whatman paper | +/− | +/− | +/− | +/− | +* | ++* | +++* | |
| Whatman paper-YE | + | ++ | ++* | ++* | ++* | +++* | | |
| Whatman paper + 1.0% glucose | + | ++ | ++* | ++* | ++* | +++* | | |
| Whatman paper + 0.1% octanoate | n.d. | | | | n.d. | | | |
| cotton wad | +/− | +/− | +/− | +/− | + | ++ | +++ | |
| cotton | +/− | +/− | +/− | +/− | + | ++ | +++ | |
| cotton + 1.0% glucose | +/− | +/− | +/− | +/− | ++* | +++* | | |
| cotton + 0.1% octanoate | n.d. | | | | n.d. | | | |
| flax | − | − | +/− | +/− | +* | ++* | ++* | ++* |
| sisal | − | − | +/− | +/− | +* | ++* | ++* | ++* |
| wood wool | − | − | − | − | − | − | − | − |
| straw | n.d. | | | | n.d. | | | |
| hay | n.d. | | | | n.d. | | | |
| laser print | n.d. | n.d. | | | | | | |
| paper tissue | n.d. | | | | n.d. | | | |
| magazine | n.d. | | | | n.d. | | | |
| newspaper | n.d. | | | | n.d. | | | |

*Bacteria adhere to the fibrous material; a: first decomposition phenomena are visible; A: cellulosic substrate is completely dissolved; d: days; YE: yeast extract; n.d.: not determined The complete decomposition of cellulosic material was only observed with P. fluorescens var. cellulose and Cellulomonas fimi when grown on certain substrates (Table 9). of the substrates examined, Whatman paper (a special laboratory blotting paper) and laser prints on white paper, in particular, were completely dissolved and degraded by both organisms within four days. Within one week, P. fluorescens var. cellulosa also dissolved flax. Further utilizable substrates are magazine paper and recycling paper tissues whereas no dissolution phenomena were detectable within one week with cotton scraps, cotton wad, sisal, wood wool and other substrates (Table 9). However, on the macroscopically non-decomposed substrates, growth of the culture could in part be detected from an increase of turbidity (Table 9). Octanoic acid inhibits the growth of both bacteria. C. fimi was unable to grow without yeast extract, and the growth of P. fluorescens var. cellulosa was slowed down without yeast extract (Table 9).

The microscopic image showed that P. fluorescens var. cellulosa became adhered to the cellulose fibers during growth while this was not the case with C. fimi. Both strains had been purchased as cellulose utilizing reference strains from the Deutsche Sammlung von Mikroorganismen (DSM). C. fimi did not store any PHF on any of the substrates tested whereas P. fluorescens var. cellulosa synthesized extremely low amounts of PHD (about 1% of the cellular dry mass). This low content was not sufficient to bond fibers.

With all of the other bacteria examined, which exhibited little growth on the substrates tested, the cellulosic material remained unchanged macroscopically, the cellular yield was low, and PHFs could not be detected by gas chromatography (Table 9). Since most of the material employed are natural materials (sisal, flax, straw, hay) or have an otherwise heterogeneous composition (cotton scraps, printed paper), they contain a wide variety of substances in addition to the basic material, cellulose. These are possibly utilized by different bacteria and used as a substrate for growth. In addition, chemical processing steps in the preparation of the final products possibly result in an increase or decrease of utilizability. Therefore, whether the cause of the observed cellular growth of some pseudomonads on cotton scraps, Whatman paper or flax through is based on a degradation of cellulose or of impurities within the fibrous material, could only be established by a complete decomposition of the cellulose. Since cellulose consists of crystalline and amorphous components which can be utilized by bacteria differently well, the proportion of these regions within the fibers may possibly by responsible for limited utilizability and limited growth. Treatment of the cellulose fibers, for example, with aqueous sodium hydroxide, prior to the use as a substrate should promote utilizability.

If the above described cultures containing fibrous materials were fed with glucose supplements, there was immediate onset of growth, and the growth of the different strains came to an end after about 24 hours. Granules of accumulated polymers were then visible under a microscope with phase contrast after 24 to 48 hours. With respect to the macroscopic appearance, two forms could clearly be distinguished. Most of the cultures then contained homogeneous bacterial suspensions in which the cells did not adhere to the fibers. In contrast, a few strains formed both aggregates consisting of cells only and aggregates consisting of cells and fibers. These are P. sp. GP4BH1 which can store PHB and PHD (Steinbüchel and Wiese (1992), "A Pseudomonas strain accumulating polyesters of 3-hydroxybutyric acid and medium-chain-length 3-hydroxyalkanoic acids", Appl. Microbiol. Biotechnol. 37, 691–697) and Rhodococcus ruber which is able to accumulate PHB/HV. In the case of Rh. ruber, the addition of thiamine or yeast extract as supplements promoted growth. The results are summarized in Table 10.

TABLE 10

The standard of assessment is the same as that of Table 2

| Bacterium | Substrate | Fiber content | Assessment/remarks |
|---|---|---|---|
| *Rh. ruber* | glucose | flax | +++ |
| *Rh. ruber* | glucose | cotton wad | ++ |
| *Rh. ruber* | glucose | cotton scraps | ++ |
| *Rh. ruber* | glucose | flax | +++ |
| *M. extorquens* B65 | methanol | flax | +++ |
| *M. extorquens* B65 | methanol | flax | +++ |
| *M. extorquens* B65 | methanol | cotton scraps | ++ |
| *M. extorquens* B65 | methanol | cotton scraps | + |
| *M. rhodesianum* | methanol | cotton scraps | +++ |
| *M. rhodesianum* | methanol | cotton scraps | + |
| *P.* sp. GP4BH1 | gluconate | flax | + |
| *P.* sp. GP4BH1 | gluconate | cotton scraps | +++ |
| *P. putida* KT2440 | gluconate | cotton scraps | − |
| *P. citronellolis* | gluconate | cotton scraps | − |
| *A. eutrophus* H16 | gluconate | cotton scraps | +++ |
| *A. eutrophus* H16 | gluconate | cotton scraps (t = 48 h) | +++ |
| *A. eutrophus* H16 | gluconate | cotton scraps | +++ |
| *A. eutrophus* H16 | gluconate | cotton scraps (t = 48 h) | +++ |
| *A. eutrophus* H16 | gluconate | cotton wad | +++ |
| *A. eutrophus* H16 | gluconate | wood wool | +++ |
| *A. eutrophus* H16 | gluconate | flax | +++ |
| *A. eutrophus* H16 | gluconate | sisal | +++ |

We claim:

1. A process for the preparation of a composite material made of a fibrous material and binders in the form of a polymer of hydroxyfatty acids the monomers of which are derived from saturated or unsaturated 3-hydroxyfatty acids having from 4 to 16 carbon atoms in the fatty acid residue, characterized in that microorganisms producing said polymer of hydroxyfatty acids are grown in the presence of fibrous material, wherein said fibrous material serves as a nutrient for the microorganisms, and another carbon source, the microorganisms are harvested along with the fibers, and pressed in a dried or moist condition, optionally using additional fibrous materials, into composite materials.

2. The process according to claim 1, characterized in that microorganisms producing polymers of hydroxyfatty acids are grown in the presence of fibrous material without another carbon source, the microorganisms utilizing part of the fibrous material as a carbon source, the microorganisms are harvested along with the fibers, and pressed in a dried or moist condition, optionally using additional fibrous materials, into composite materials.

3. The process according to claims 1 or 2, characterized in that a PHF-synthetic gene expressing recombinant microorganism is used as said microorganism.

4. The process according to claims 1 or 2, characterized in that said polymer of hydroxyfatty acids is derived from monomers of one or more different hydroxyfatty acids.

5. The process according to claim 4, characterized in that said polymer of hydroxyfatty acids is selected from poly(3-hydroxybutyric acid) (PHB), poly(3-hydroxybutyric acid/3-hydroxyvaleric acid) copolymer (PHB/HV) and poly(3-hydroxydecanoic acid), or mixtures thereof.

6. The process according to claims 1 or 2, characterized in that said composite material contains from 5 to 50% by weight of said polymer of hydroxyfatty acids.

7. The process according to claims 1 or 2, characterized in that said fibrous material is selected from flax, sisal, hemp, wood wool, mechanical wood pulp, wood fibers, coirs, leather, cotton wad, hay, straw, sawdust, wood shavings, pine chips, glumes of grains, seed scraps, oat flakes, cereals, bran, paper strips, cotton scraps, synthetic fibers, such as polybutylene terephthalates, polyethylene terephthalates, nylon 6, nylon 66, nylon 12, viscose and rayon.

8. A composite material connpsing a fibrous material and binders in the form of a polymer of hydroxyfatty acids produced according to claim 1 or 2 for the preparation of molded parts in the automobile field.

9. The composite material of claim 8, wherein said molded parts are adapted for use as acoustic attenuation in the areas of an automobile selected from the group consisting of a hood, a bulkhead (on both sides), a tunnel, a door, a roof, a footwell, pumps, A to D pillars, and air distribution duct.

10. The composite material of claim 8, wherein said molded parts are adapted for use as a base for interior trims of an automobile selected from the group consisting of instrument panel covers, tunnel linings, door trims, seat back linings, A to D pillar linings and spare wheel covers, said base being optionally self-supporting, or as automobile parts selected from the group consisting of roof liners, rear shelves, filling pieces, trunk mats and undershields.

11. The process according to claim 6, charactenzed in that said composite material contains from 10 to 35% by weight of said polymer of hydroxyfatty acids.

* * * * *